Jan. 11, 1966 H. W. KOGER 3,228,678
APPARATUS FOR FITTING BONDED COUPLINGS TO FLEXIBLE
OR SEMI-FLEXIBLE TUBULAR CONDUITS
Filed June 11, 1963 6 Sheets-Sheet 1

Hershell W. Koger
INVENTOR.

BY

Attorney

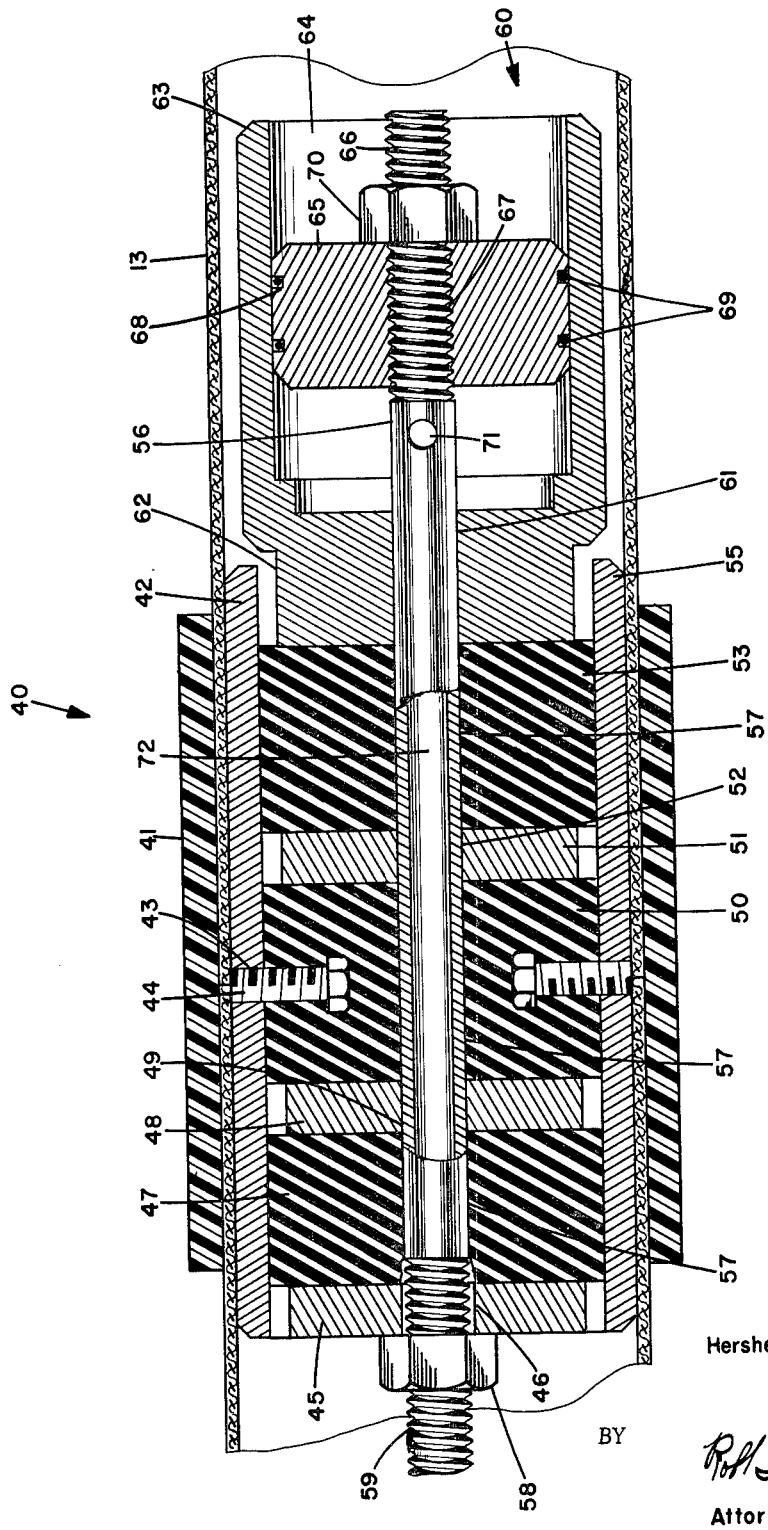

United States Patent Office 3,228,678
Patented Jan. 11, 1966

3,228,678
APPARATUS FOR FITTING BONDED COUPLINGS TO FLEXIBLE OR SEMI-FLEXIBLE TUBULAR CONDUITS
Hershell W. Koger, Huntsville, Ala., assignor to Thiokol Chemical Corporation, Bristol, Pa., a corporation of Delaware
Filed June 11, 1963, Ser. No. 287,135
5 Claims. (Cl. 269—48.1)

This invention relates to improvements in apparatus for fitting couplings to flexible or semi-flexible tubular conduits and, more particularly, to apparatus for use with bonded couplings that are to be fitted to the conduits by means of controlled pressure.

The use of bonded couplings and the apparatus for fitting them to flexible or semi-flexible conduits permits the use of such couplings where it would be impracticable to use couplings that are fitted in any other manner.

The apparatus of the instant invention may be operated manually or may be operated by a fluid under pressure. The manually-operated form of the invention permits the use thereof in the field or where a fluid under pressure is not available. The pressure-operated form of the invention may be used in a repair shop or where a fluid under pressure is available.

The couplings that are adaptable for use with the instant invention are made of a strong, durable, non-metallic plastic material that will withstand the use of high pressures within the conduits to which they are to be fitted.

The apparatus comprising the instant invention is assembled from a minimum of parts and is efficient in its operation in either form of the invention.

It is an object of the present invention, therefore, to provide an apparatus for fitting bonded couplings to flexible or semi-flexible tubular conduits.

It is another object of the invention to provide an apparatus of the type described that is simple in construction, efficient in operation and can be operated in either the field or in a maintenance shop with equal skill and rapidity.

With the above and other objects and advantages in view, the invention consists of the novel details of construction, arrangement, and combination of parts more fully hereinafter described, claimed, and illustrated in the accompanying drawings in which:

FIGURE 6 is a view similar to FIGURE 5 showing the expandable arrangement of the elements incorporated therein.

Figure 1:
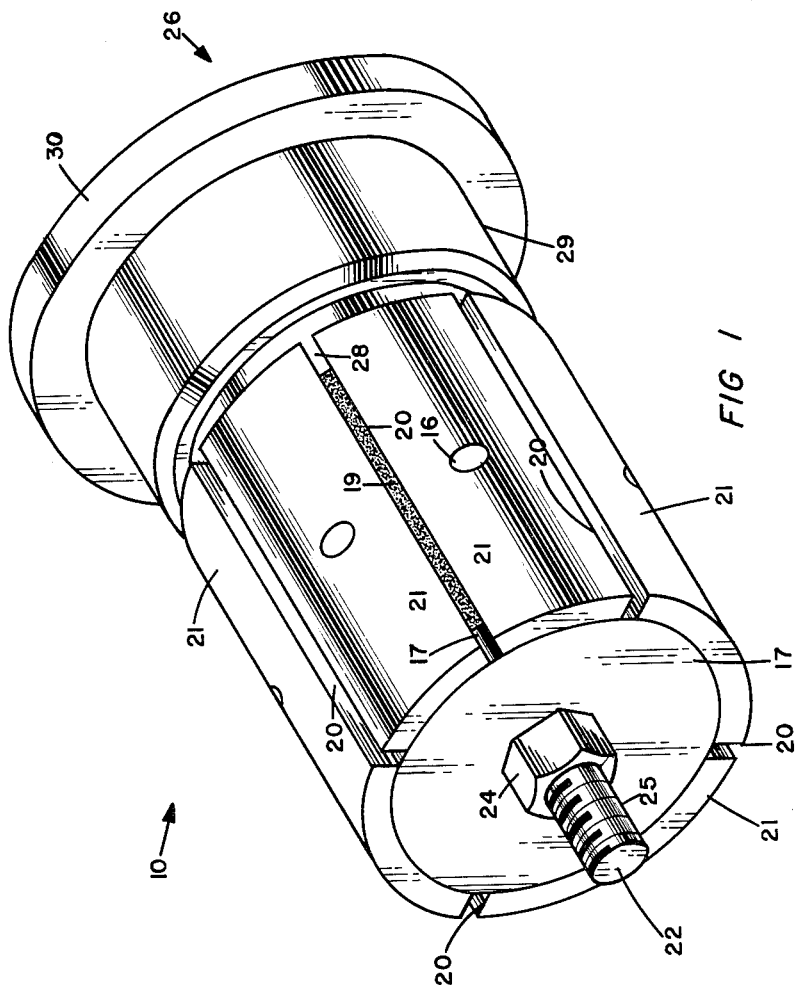
FIGURE 1 is a perspective view of a manually-operated form of the invention with certain elements removed.
Figure 2:
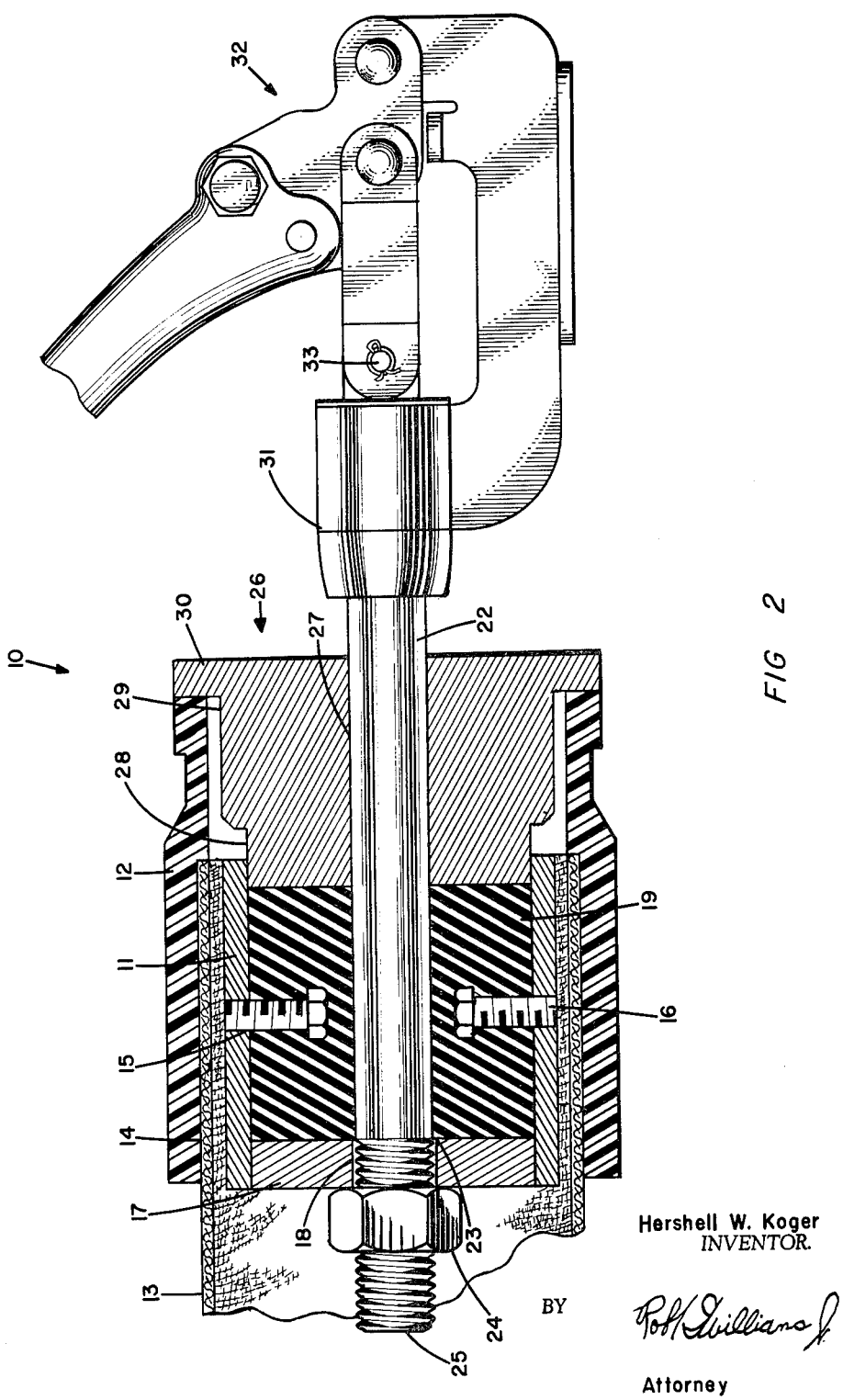
FIGURE 2 is a sectional view of the form of FIGURE 1, partly broken away, and showing the apparatus in the non-expandable arrangement of the elements incorporated therein.
Figure 3:
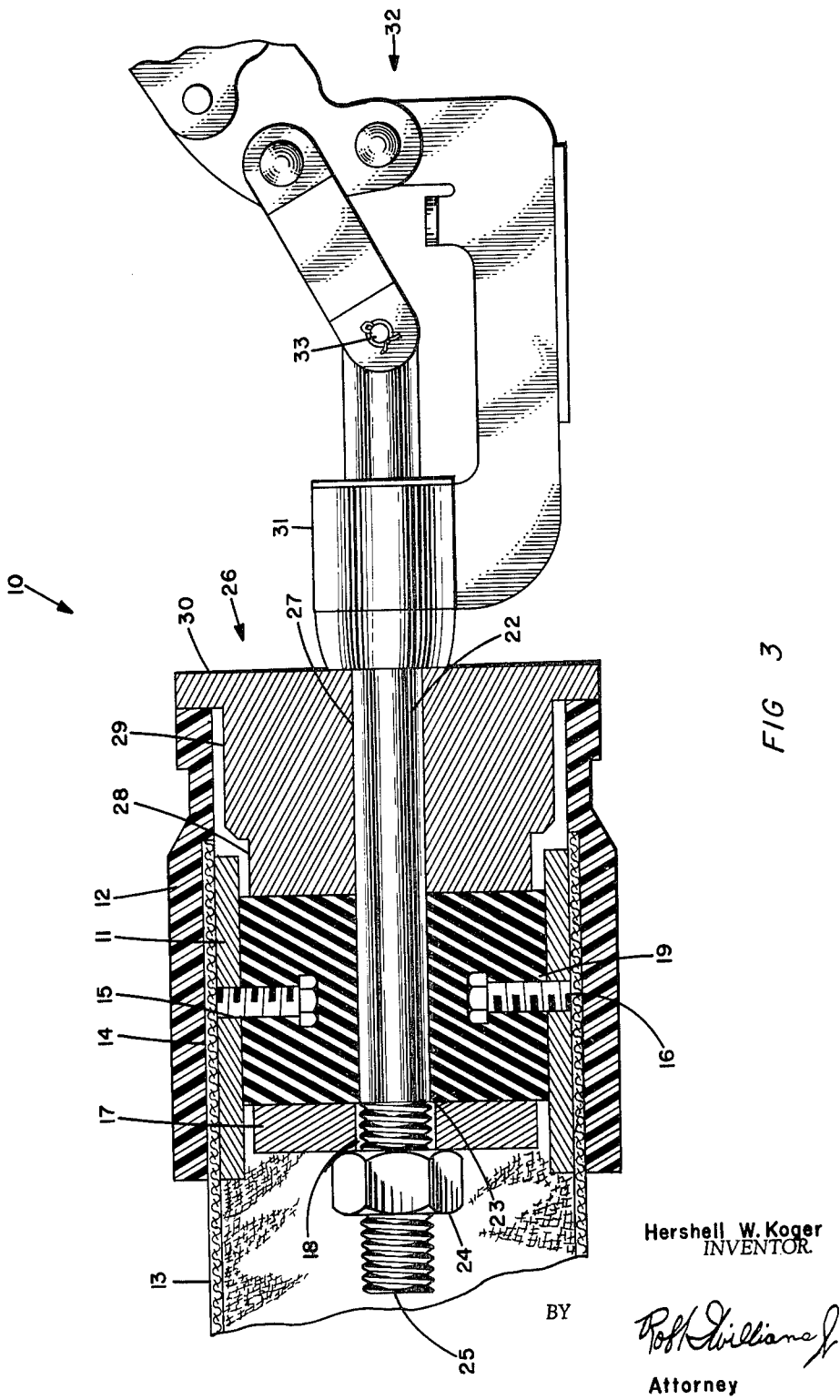
FIGURE 3 is a view similar to FIGURE 2 showing the expandable arrangement of the elements.

Referring more in detail to the drawings, and more especially to FIGURES 1 to 3 inclusive, wherein like parts are designated by like reference numerals, and wherein the manually-operated form of the invention is disclosed, the reference numeral 10 is used to generally designate the apparatus embodying this form of the invention.

The apparatus 10 comprises a cylinder 11, the dimensions of which as to diameter and length are varied to fit within the internal circumference of a suitable coupling 12, which may also be varied in size to conform with the size of the flexible or semi-flexible tubular conduit to which it is to be fitted. The coupling 12 is made of a suitable plastic material; and the tolerance between the coupling 12 and the cylinder 11 is sufficient to permit a conduit 13 to be fitted into an annular recess 14 in one end of the coupling 12.

A plurality of radially-disposed, equally-spaced, threaded bores 15 are provided in the wall of the cylinder 11, centrally of the length thereof, and a plurality of bolts 16 are secured in the bores 15, so that the heads of the bolts extend into the cylinder 11 and are in inverted relation to the outer surface of the cylinder 11. A washer 17 of a size to loosely fit within the cylinder 11 is then positioned therein at one end thereof; and a mandrel of predetermined size, not shown, is inserted through the opening 18 in the washer 17 and centrally of the heads of the bolts 16 after a mold-releasing material has been applied to the mandrel. A semi-liquid, uncured elastomeric material 19 is then poured into the cylinder and is left therein a sufficient time for the proper curing thereof. After the curing of the material 19, a plurality of equally-spaced, radially-disposed, longitudinally-extending slots 20 are then cut completely through the wall of the cylinder and the mandrel is then removed. The slots 20 are extended centrally of the bolts 16 so that a bolt 16 is connected to each of the segments 21 of the cylinder 11 that are provided by the slots 20. The mold-release material applied to the mandrel permits the removal thereof from the material 19; and the bolts that are now embedded in the material 19 retain the segments 21 in fixed relation to the material 19. A shaft 22 of a comparable size to the mandrel is then inserted into the bore 23 in the material 19 and a nut 24 is then threaded onto the threaded end 25 of the shaft 22 until it engages the outer surface of the washer 17.

An expander 26 is slidably mounted on the shaft 22 by means of a central bore 27 and the expander 26 is provided with a reduced end portion 28 that will loosely fit into the cylinder 11 and engage the material 19. The expander 26 also has a medial or intermediate portion 29 that is larger than the reduced portion 28 and is of a size to loosely fit within the coupling 12. An annular flange 30 is then provided on the opposite end of the expander 26 and is of a circumferential size that will permit it to engage and be seated on the free end of the coupling 12.

After the expander 26 is in place, the free end of the shaft 22 is extended through a guide stop 31 that is part of a cam mechanism 32 to which the shaft 22 is pivotally connected, as at 33. The cam mechanism 32 is of conventional design and is used for purposes of illustration, since any well-known type of cam mechanism that is suitable for the operation of the apparatus 10 can be connected to the shaft 22.

In the use of the apparatus 10, "Ren" paste (an adhesive manufactured by the Ren Plastics Corporation, Lansing, Michigan) is applied to the inner surface of the coupling 12 and to the outer surface of the conduit 13. Just enough of the paste being required to wet both of the surfaces to which it is to be applied, and then the end of the conduit 13 having the paste applied thereto is inserted into the annular recess 14 of the coupling 12.

The cylinder 11 and expander 26 are then inserted into the free end of the coupling 12; and the end of the conduit 13 positioned in the coupling 12 until the apparatus 10 assumes the non-expandable position (shown in FIGURE 2). The cam mechanism 32 is then actuated so that it will be moved to the expandable position shown in FIGURE 3 causing the shaft 22 to move the washer 17 within the cylinder 11 to start compressing the material 19. The material 19 will then start to expand against the reduced portion 28 of the expander 26 and such action will cause the expander 26 to move on the shaft 22 until it engages the stop 31 of the cam mechanism 32. Further movement of the cam mechanism 32 will cause the material 19 to expand and force the segments 21 that are connected to the material 19 by means of the bolts 16 into engagement with the inner surface of the conduit 13. The pressure of the segments 21 will be evenly distributed over the inner surface of the conduit 13 so that a constant even pressure is extended onto the inner surface of the conduit 13 within the coupling 12.

Pressure on the conduit 13 is maintained until the paste sets, and the coupling 12 is thus bonded to the conduit 13 at which time the apparatus is then removed from the coupling 12; and it has been found that, if the coupling 12 is properly bonded to the conduit 13, the coupling 12 will not become disengaged from the conduit 13 until a force of more than 2,000 p.s.i. has been exerted on the coupling 12.

Figure 4:
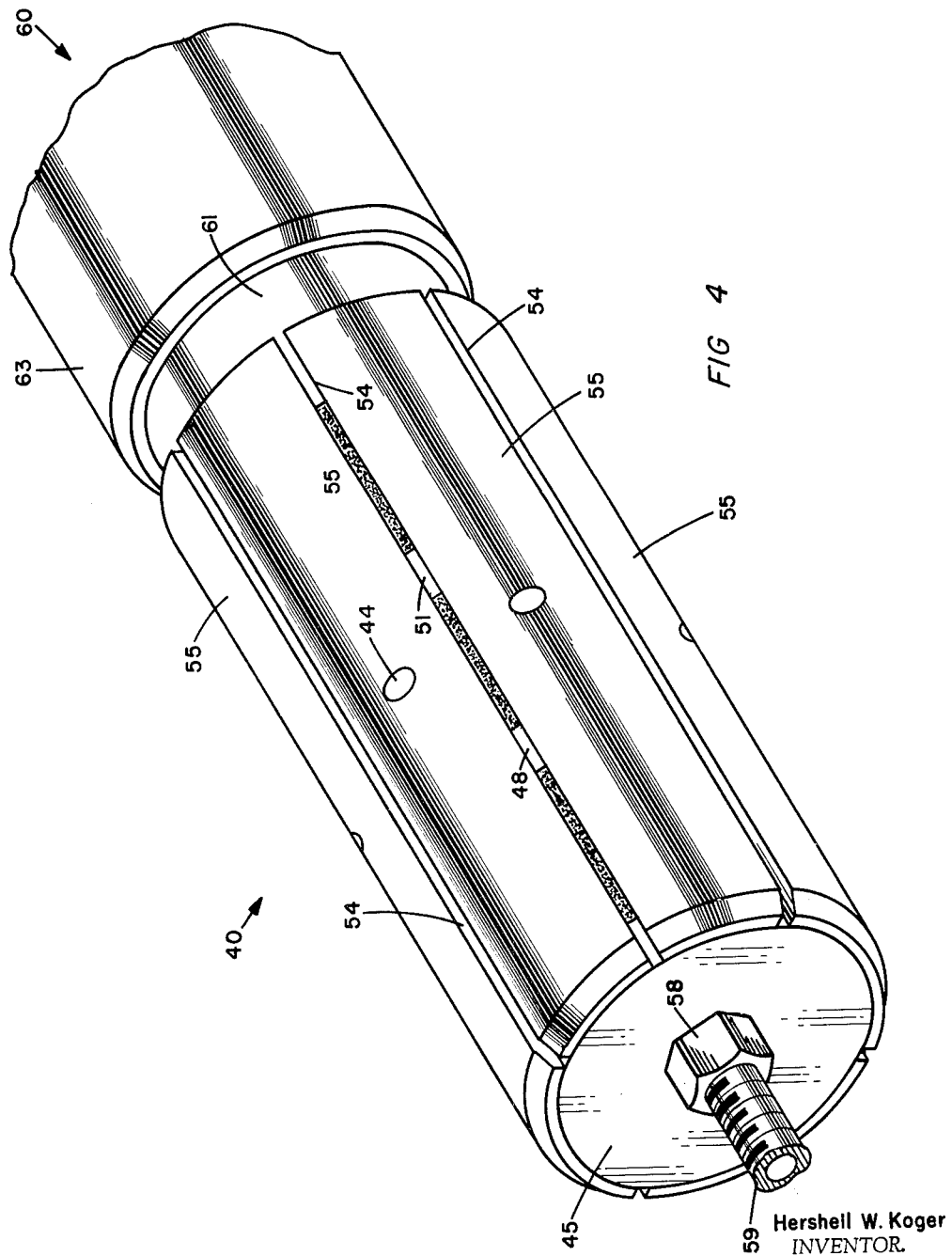
FIGURE 4 is a perspective view of the pressure-operated form of the invention with certain elements removed.
Figure 5:
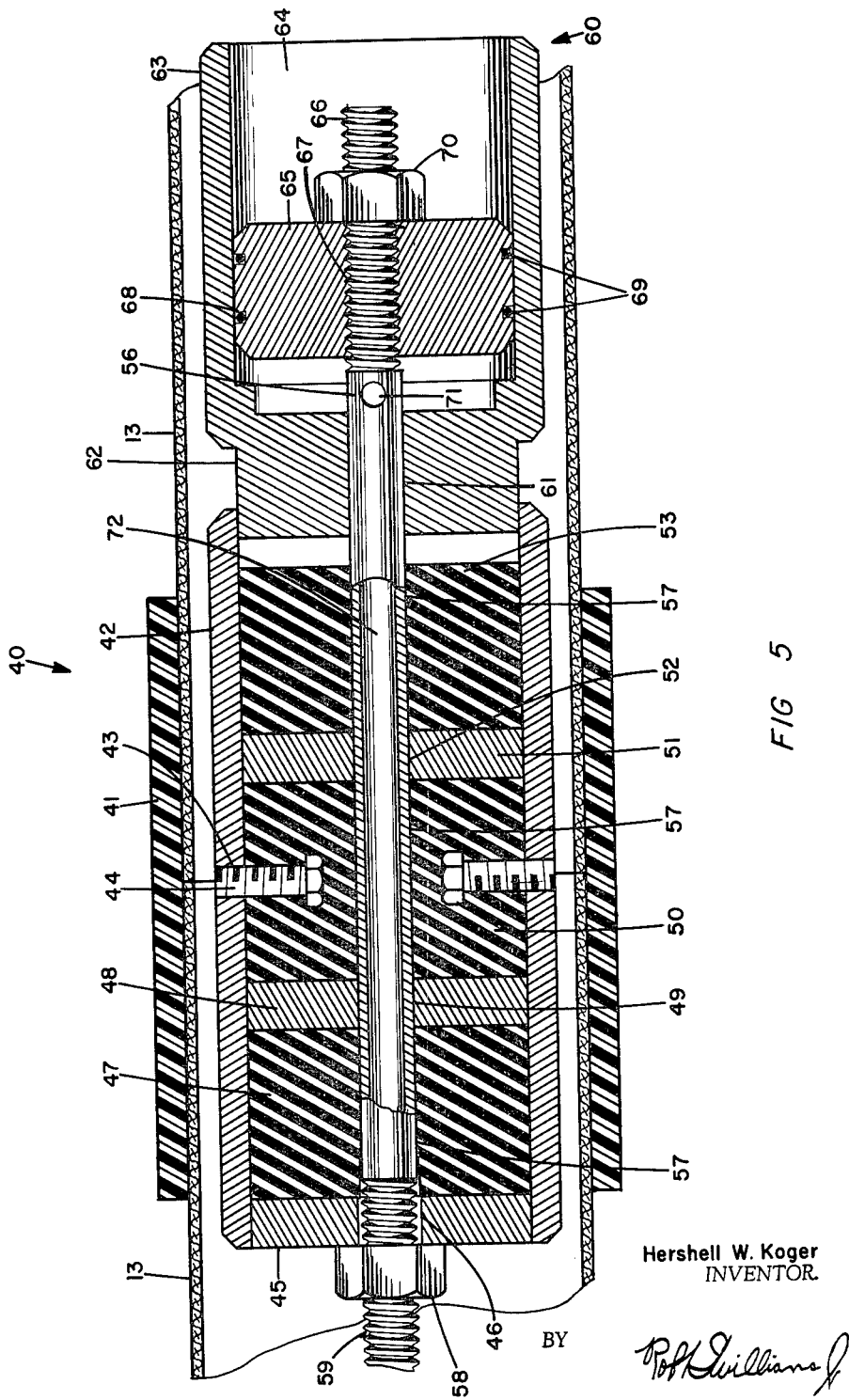
FIGURE 5 is a sectional view of the form of FIGURE 4, partly broken away, and showing the apparatus in the non-expandable arrangement of the elements incorporated therein.

In FIGURES 4 to 6 inclusive, the fluid-pressure-operated apparatus 40 is illustrated and, as shown, is constructed so that two lengths of conduit 13 may be joined into a unitary length by means of a coupling 41.

The apparatus 40 like the apparatus 10 comprises a cylinder 42, and the coupling 41 is also made from a nonmetallic material. A plurality of radially-disposed, equally-spaced, threaded bores 43 are provided in the wall of the cylinder 42 and a plurality of bolts 44 are secured in the bores 43 in the same inverted relation to the outer surface of the cylinder 42 as the bolts 16 are in inverted relation to the outer surface of the cylinder 11.

A washer 45 is loosely positioned within the cylinder 42 at one end thereof, and a mandrel of predetermined size, not shown, is inserted through the opening 46 in the washer 45 after a mold-releasing material has been applied to the mandrel. A predetermined amount of an uncured, semi-liquid, elastomeric material 47 is then poured into the cylinder 42 and a second washer 48 is then positioned in the cylinder 42 by means of an opening 49 therein. A second predetermined amount of an uncured, semi-liquid, elastomeric material 50 is then poured into the cylinder 42 and a third washer 51 is then positioned in the cylinder 42 by means of an opening 52 therein. A third amount of an uncured, semi-liquid, elastomeric material 53 is then poured into the cylinder 42 and all three amounts of the uncured elastomeric material are left therein a sufficient time for the proper curing thereof. After the curing of the elastomeric material, a plurality of equally-spaced, radially-disposed, longitudinally-extending slots 54 are then cut completely through the wall of the cylinder 42; and the mandrel is then removed. The slots 54 are cut centrally of the bolts 44 so that a bolt 44 is connected to each of the segments 55 of the cylinder 42 that are provided by the slots 54. The mold-release material applied to the mandrel permits the removal thereof from the elastomeric material; and the bolts 44 that are now embedded in the central portion of the elastomeric material 50 retain the segments 55 in fixed relation to the elastomeric material 50.

A shaft 56 of a comparable size to the mandrel is then inserted into the bores 57 in the elastomeric material 47, 50, and 53 and a nut 58 is then threaded onto the threaded end 59 of the shaft 56.

An expander 60 is then slidably mounted on the shaft 56 by means of a central bore 61, and the expander 60 is provided with a reduced end portion 62 that will loosely fit into the cylinder 42 and engage the elastomeric material 53. The expander 60 also includes a hollow portion 63 that is larger than the reduced portion 62 and of a size to loosely fit within the conduit 13. The hollow portion 63 provides a chamber 64 in which a piston 65, that is threadably secured to the oppositely-threaded end 66 of the shaft 56 by means of a central, threaded bore 67, is mounted for reciprocation therein. The piston 65 is provided with a pair of spaced annular grooves 68 in each of which is positioned a sealing O-ring 69, and a nut 70 on the threaded end 66 of the shaft 56 retains the piston 65 in rigid fixed relation to the shaft 56.

Inwardly of the threaded end 66 of the shaft 56, there is provided a transversely extending port 71 and that portion of the shaft 56 extending from the port 71 to the threaded end 59 of the shaft 56 is hollow, as shown at 72, in FIGURES 5 and 6. Lubrication ducts of conventional size and form may be added to either form of the invention to prevent binding of the moving parts as found to be necessary.

The use of this form of the invention as to the bonding of the coupling 41 to the conduit 13 is identical to that as set forth for the manually-operated form of FIGURES 1 to 3 inclusive; except in this form of the invention, a supply hose for fluid under pressure is connected to the hollow threaded end 59 of the shaft 56 by any conventional coupling, not shown, that may be used for the purpose.

Fluid under pressure is introduced into the chamber 64 against the working face of the piston 65 by means of the port 71; and as the pressure volume increases, the piston 65 forces the expander into compressing contact with the elastomeric material 53 while at the same time moving the washer 45 into compressing contact with the elastomeric material 47. With the apparatus 40 in the position shown in FIGURE 6, the various amounts of elastomeric material have been forced to expand to move the segments 55 into contact with the inner surfaces of the sections of conduit 13. As in the previously described form of the invention, the pressure of the segments 55 will be evenly distributed so that a constant even pressure is exerted on the inner surfaces of the sections of the conduit 13 within the coupling 41.

Pressure will be maintained until the paste sets, when the fluid under pressure is permitted to escape through the shaft 56, and the apparatus can then be removed. The length of the supply hose connected to the shaft 56 can be on any desired length, and the control for the injection and escape of the fluid under pressure can be located at the source of supply for the fluid under pressure. The apparatus 40, is capable of easy removal from the conduit 13 by pulling on the supply hose connected to the apparatus 40.

There has thus been described a manually-operated and a pressure-operated apparatus for bonding couplings to flexible or semi-flexible conduits; and it is believed that the structure and manner of operation of the apparatus forming the instant invention will be understood by those skilled in the art from the foregoing description.

It is also to be understood that certain variations in the forms of the invention may be adhered to provided such variations fall within the spirit of the invention and the scope of the appended claims.

Having thus described the invention, what is claimed as new and desired to be secured by Letters Patent is:

1. An apparatus for use in adhesively bonding a coupling to a conduit comprising a plurality of radially-movable, peripheral segments, an elastomeric material secured to the inner surface of said segments to provide a unitary cylindrical structure and means for expanding said elastomeric material for radially moving said peripheral segments.

2. An apparatus, as in claim 1, wherein threaded bolts are secured to each of said segments and extend inwardly of said segments with the heads thereof in inverted relation to the outer surfaces of said segments and said bolts being embedded in said elastomeric material.

3. An apparatus, as in claim 1, wherein the means for expanding said elastomeric material comprises a shaft extending through said elastomeric material and having a fixed washer on one end and an expander slidably mounted on the opposite end and means cooperating with said expander for moving said expander into engagement with said elastomeric material for the expanding thereof.

4. An apparatus, as in claim 3, wherein the means cooperating with said expander comprises a shaft extending through said elastomeric material and manually operated means connected to said shaft for longitudinal movement thereof.

5. An apparatus, as in claim 3, wherein the means cooperating with said expander comprises a partially hollow shaft having a transversely-extending port therein and a piston on one end thereof whereby a fluid under pressure may be caused to flow through said shaft and act on said piston for the longitudinal movement of said shaft.

References Cited by the Examiner

UNITED STATES PATENTS

| 2,119,465 | 5/1938 | Meyer | 156—156 |
| 2,345,091 | 3/1944 | Brace et al. | 279—2 |
| 2,695,255 | 11/1954 | Avery | 156—423 |
| 3,080,269 | 3/1963 | Pollock et al. | 156—423 |

EARL M. BERGERT, *Primary Examiner.*

H. F. EPSTEIN, *Assistant Examiner.*